United States Patent [19]

Miyake et al.

[11] 4,427,898
[45] Jan. 24, 1984

[54] MOBILE POWER STATION APPARATUS

[75] Inventors: Yoshikazu Miyake, Itami; Kenichi Ootsuka, Amagasaki, both of Japan

[73] Assignee: Mitsubishi Denki Kabushiki Kaisha, Japan

[21] Appl. No.: 447,160

[22] Filed: Dec. 6, 1982

[30] Foreign Application Priority Data

Dec. 22, 1981 [JP] Japan .......................... 56-192286[U]
Dec. 23, 1981 [JP] Japan ............................. 56-192022

[51] Int. Cl.³ .............................................. H02J 3/00
[52] U.S. Cl. ............................................ 307/9; 361/117
[58] Field of Search ..................... 307/9, 10 R, 10 LS, 307/125, 126; 361/117, 331, 333, 376

[56] References Cited

U.S. PATENT DOCUMENTS 2,551,841  5/1951  Kepple et al. ...................... 361/333
4,367,512  1/1983  Fujita ................................. 361/333

Primary Examiner—E. A. Goldberg
Assistant Examiner—D. Jennings
Attorney, Agent, or Firm—Leydig, Voit, Osann, Mayer & Holt, Ltd.

[57] ABSTRACT

A mobile power station apparatus, in which a plurality of lightning arresters are disposed adjacent to each other together with electric equipment on a vehicle, and which is provided with rotary means for adjusting the insulation gap between the ends of adjacent lightning arresters is provided.

4 Claims, 6 Drawing Figures

MOBILE POWER STATION APPARATUS

BACKGROUND OF THE INVENTION

This invention relates to a mobile station apparatus which can move in a state equipped with all necessary motor apparatus such as a transformer and a lightning arrester.

FIG. 1 shows an example of such prior art apparatus. In this apparatus, a transformer 3 and lightning arresters 4 are mounted on the floor 2 of a vehicle such as trailer or truck. FIG. 2 shows another example of the apparatus, in which a lower voltage switch 5 and a high voltage switch 6 are mounted as well as transformer 3 and lightning arrester 4.

In the prior art mobile power station apparatus, it is necessary to increase the inter-phase insulation gap of the arrester in case where the voltage of the electric circuit in which the power station apparatus is installed is high.

Where the lightning arrester 4 in which the inter-phase arrester is increased is mounted on the vehicle, the dimension of the vehicle must be increased that much. In this case, the total length of the vehicle 1 is inevitably too long, leading to difficulties in the movement of the vehicle. Therefore, hitherto it has been in practice to remove the arrester from the vehicle 1 for transporting it separately from the vehicle 1. That is, it has been impossible to effect transport with the vehicle fully equipped with the apparatus such as the lightning arrester.

SUMMARY OF THE INVENTION

An object of the invention is to provide a mobile power station apparatus, which can overcome the drawback in the prior art and can permit transport with the vehicle fully equipped with the power station apparatus including lightning arrester by changing the relative positions of the individual phase portions of the lightning arrester.

BRIEF DESCRIPTION OF THE DRAWINGS

In the Figures, like reference numerals designate like parts.

DESCRIPTION OF THE PREFERRED EMBODIMENTS

Figure 1:
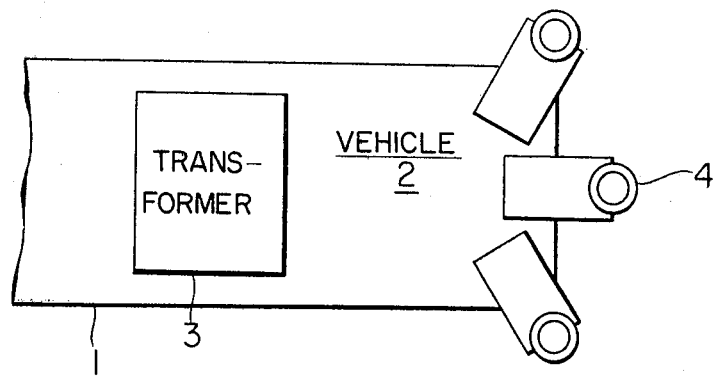
FIG. 1 is a fragmentary plan view showing an example of the prior art mobile power station apparatus.
Figure 2:
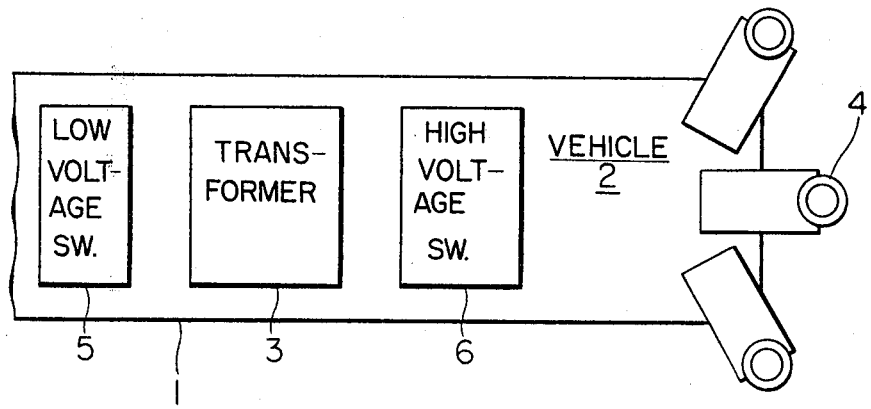
FIG. 2 is a fragmentary plan view another example of the prior art mobile power station apparatus.
Figure 3:
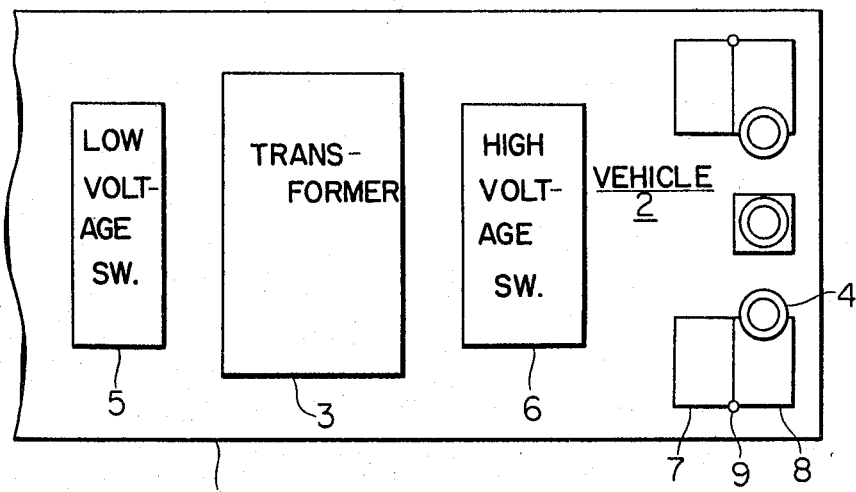
FIG. 3 is a fragmentary plan view showing an embodiment of the mobile power station apparatus according to the invention in a state of transport.
Figure 4:
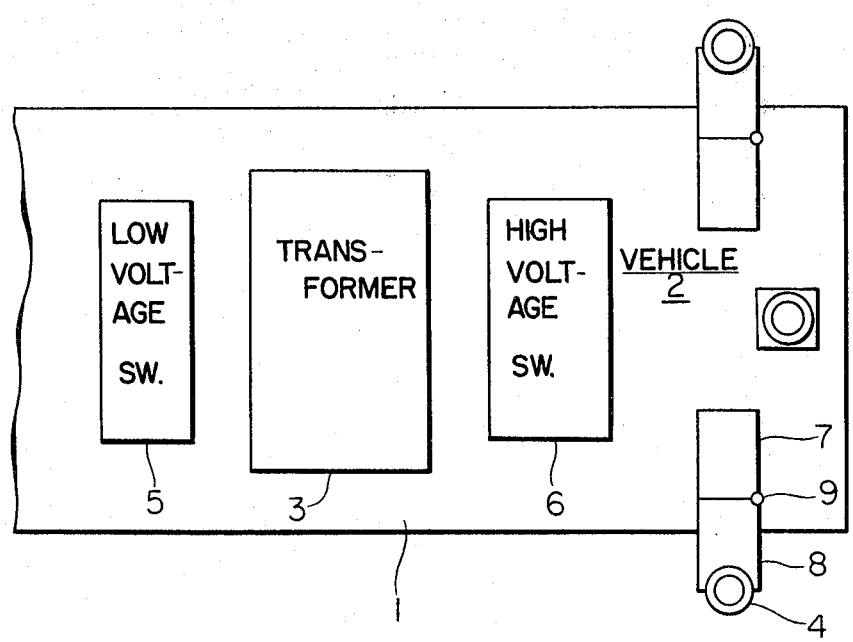
FIG. 4 is a fragmentary plan view showing the mobile power station apparatus of FIG. 3 in an installed state.

Now, a preferred embodiment of the invention will be described with reference to FIGS. 3 and 4. In the Figures like or corresponding parts to those in FIGS. 1 and 2 are designated by like reference numerals. Referring to FIGS. 3 and 4, designated at 7 are lightning arrester mounts secured by means of bolting or welding to the body or floor 2 of the vehicle 1. Designated at 8 are supports for lightning arresters 4. The supports 8 are rotatably supported for lateral turning movement about a vertical axis being in this case mounted by hinges 9 to the lightning arrester mounts 7.

When the mobile power station apparatus of the above construction is being transported, i.e., when it is not necessary to secure the inter-phase gap of the lightning arrester, the arresters 4 are held in a state that results by turning it inwardly with respect to the vehicle 1 as shown in FIG. 3. In this state, the length and width dimensions of the vehicle 1 may be held within the allowances for the transportation, so that the vehicle 1 can transport the station, without any trouble.

When it is necessary to secure the inter-phase gap, i.e., when operating the mobile power station apparatus, the supports 8 of the lightning arresters 4 are outwardly turned about the hinges 9 to increase the distance of the individual phase portions of the arresters 4 with respect to each other so as to secure the necessary inter-phase gap.

As has been shown, with the embodiment described above, in which the inter-phase gap of the arrester is made variable, the insulation class can be increased, and it is possible to effect transport with the vehicle equipped with all the power station apparatus even if the inter-phase gap of the lightning arrester is increased.

Figure 5:
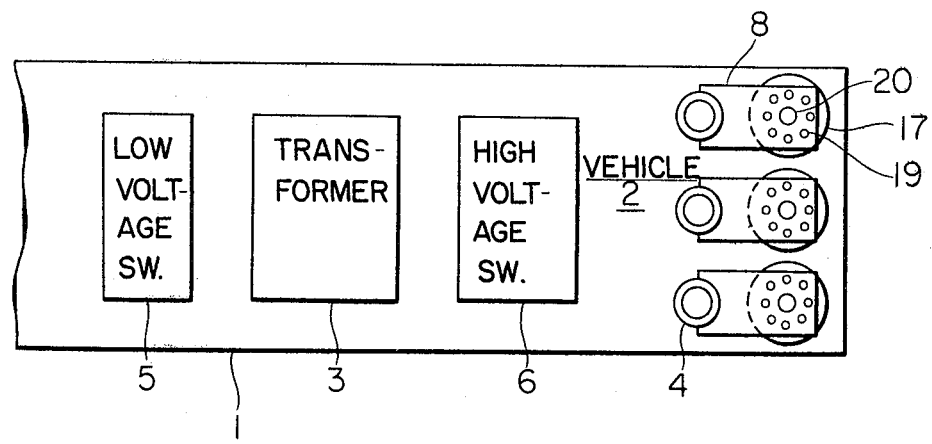
FIG. 5 is a fragmentary plan view showing another embodiment of the mobile power station apparatus according to the invention in a state of transport.
Figure 6:
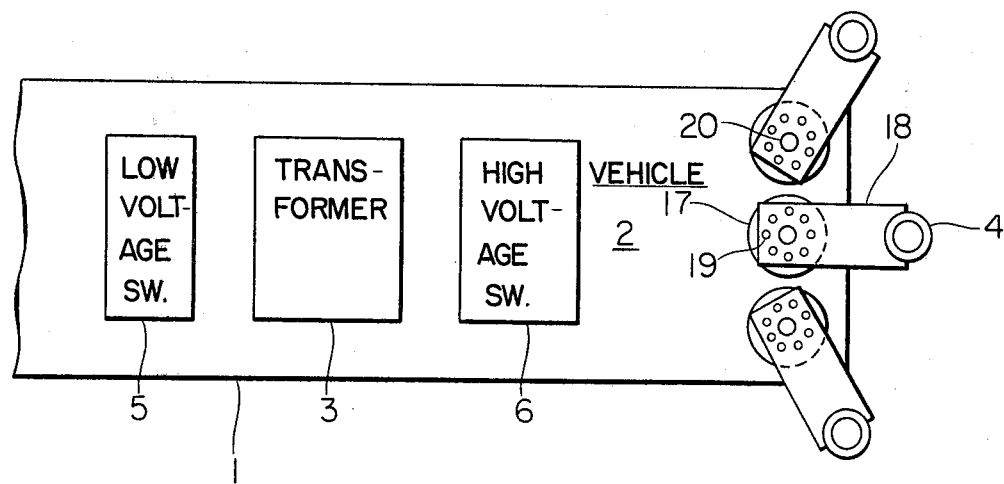
FIG. 6 is a fragmentary plan view showing a mobile power station apparatus of FIG. 5 in an installed state.

FIGS. 5 and 6 show a different embodiment of the invention. Referring to FIGS. 5 and 6, designated at 17 are arrester mounts secured by means of welding to the floor 2 of the vehicle 1, and at 18 supports of the arresters 4. The supports 18 of the arrester are rotatably supported on arrester mounts 17 by threaded bolts 19 and center bolt 20 threaded in each of the arrester supports 17.

The bolt holes for the bolts 19 are formed by a uniform radial spacing about the bolt hole for the center bolt 20. Each phase arrester is provided with bolt holes corresponding to the afore-mentioned bolt holes. The arrester is mounted with the supports 18 using the bolt holes.

When transporting the apparatus, i.e., when it is not necessary to secure inter-phase insulation gap, the arrester 4 is turned laterally inwardly about the vertical axis of the bolt 20 with respect to the vehicle 1 by removing the bolts 19 threaded in the arrester supports 17 and loosening the center bolt 20, as shown in FIG. 6. Thus, the length of the vehicle 1 may be held within the allowance, so that the vehicle 1 can transport station without any trouble.

When it is necessary to secure the inter-phase gap, i.e., when operating the mobile power station apparatus, the supports 18 of the arresters 4 are turned about the lightning arrester 17 to increase the distance of the individual phase arresters 4 so as to secure the necessary inter-phase gap.

As has been shown, with the embodiment described above, in which the inter-phase gap of the arrester is made variable like the embodiment of FIGS. 3 and 4, the insulation class can be increased, and it is possible to effect transport with the vehicle equipped with all the power station apparatus even if the inter-phase gap of the lightning arrester is increased.

What is claimed is:

1. A mobile power station apparatus comprising:
   a plurality of lightning arresters disposed adjacent to one another together with equipment on a vehicle body, said lightning arresters being disposed in a transportation position within predetermined length and width dimensions of the vehicle body; and rotary means provided on said respective lightning arresters including a support for each said lightning arrester rotatably mounted on said vehicle body for lateral turning movement to allow the respective lightning arrester to be moved from said transportation position to an operating position extending beyond said dimensions of the vehicle body for adjusting the interphase gap between the ends of adjacent lightning arresters.

2. The mobile power station apparatus according to claim 1, wherein said rotary means include hinges secured at one end to arrester mounts on said body of said vehicle and secured at the other end to respective supports for said lightning arresters.

3. The mobile power station apparatus according to claim 1, wherein said rotary means includes a center bolt hole and a plurality of bolt holes concentric with said center bolt hole and radially uniformly spaced apart, said bolt holes being formed in arrester mounts installed on said body of the vehicle, and bolt holes formed in said arrester supports to correspond to said plurality of bolt holes, said arresters being capable of being mounted with bolts threaded into said bolt holes.

4. A mobile power station apparatus comprising:

a plurality of lightning arresters disposed adjacent to one another together with equipment on a vehicle body, said lightning arresters being disposed in a transportation position within predetermined length and width dimensions of the vehicle body;

rotary means provided on said respective lightning arresters including a support for each said lightning arrester rotatably mounted on said vehicle body for lateral turning movement about a vertical axis to allow the respective lightning arrester to be moved from said transportation position to an operating position extending beyond said dimensions of the vehicle body for adjusting the interphase gap between the ends of adjacent lightning arresters; and said supports each having a center bolt hole and a plurality of bolt holes concentric with said center bolt hole and radially uniformly spaced apart, and bolt holes formed in arrester mounts on said vehicle body to correspond to said plurality of bolt holes in said supports, said arresters being capable of being fixed in a given rotary position of adjustment with bolts threaded into said bolt holes in said supports and said mounts.

* * * * *